United States Patent Office 3,443,627
Patented May 13, 1969

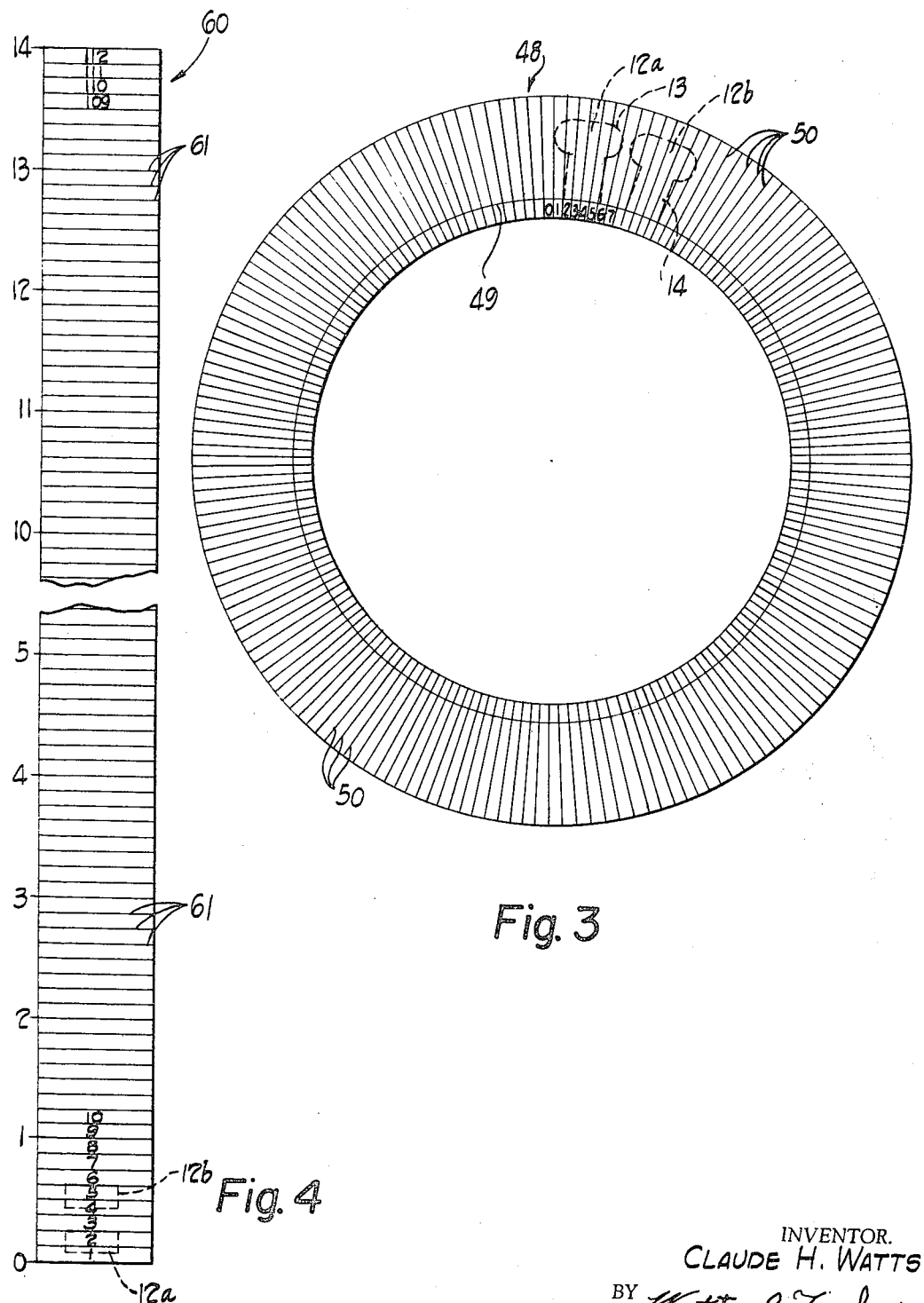

3,443,627
METHOD OF MAKING A PATTERN SET-UP FOR USE IN INVESTMENT CASTING
Claude H. Watts, Lyndhurst, Ohio, assignor to Precision Metalsmiths, Inc.
Filed Feb. 28, 1966, Ser. No. 530,488
Int. Cl. B22c 7/00, 7/04
U.S. Cl. 164—45
15 Claims

ABSTRACT OF THE DISCLOSURE

In the art of investment casting, a method of assembling a pattern set-up including the steps of positioning a pattern or patterns on one or more scales having spaced graduations which sub-divide a sprue member so that the desired distance between the gates of the patterns when attached to the sprue member can be determined, and thereafter attaching the patterns to the sprue member so that the gates of the patterns are spaced apart by the distance determined from the scale or scales; and a sprue member with visible markings for use in locating the patterns to be attached thereto. A sprue member comprising a tube and a corrugated sleeve surrounding the tube.

---

This invention relates generally to the "lost wax" process of investment casting, and more specifically to the formation of the pattern assemblies used in such a process.

In the so-called "lost wax" process, a pattern assembly, commonly referred to as a "set-up" or "tree," is prepared by attaching a plurality of patterns to a suitable sprue member. The patterns, which are replicas of the parts to be cast and include the necessary gates and risers, are made of an expendable material, such as wax, a synthetic resin or a combination of wax and synthetic resin. The set-up or tree is coated or invested with a suitable slurry which is allowed to harden to form a refractory mold. Thereafter, the patterns are destroyed, such as by subjecting the mold to heat or a solvent for the pattern material or both, to form the mold cavities.

With specific regard to the formation of the set-up or tree, the usual sprue member is cylindrical in shape and is formed either as a solid, massive piece or as a tube from an expendable material such as wax. According to another technique, the sprue member may be a hollow metal tube coated with a low melting point wax. The typical procedure which is followed in attaching the patterns involves the steps of softening the wax on the outside surface of the sprue member at selected locations, as by use of a wax welding tool. When the wax has been softened, each pattern is pressed tightly against the sprue member to embed the end of the pattern gate into the wax. These operations are manually repeated until the desired number of patterns have been attached in rows extending around and along the length of the sprue member.

The location of the several patterns on the sprue member is critical. From the standpoint of obtaining the maximum yield of castings from a mold, it is desirable to use a large number of patterns in a set-up. On the other hand, the patterns cannot be so close together as to prevent the mold from being properly formed. For example, ceramic shell molds are made by dipping a set-up in a slurry, sanding the slurry coated set-up with coarse refractory particles and then drying the coating to form a hard refractory layer. Thees operations are repeated until a refractory shell of the desired thickness has been built up around the set-up. When the patterns are too close together on the sprue member, it may be impossible to obtain a satisfactory uniform coating of the slurry over the pattern. Further, a substantial amount of slurry may be retained between closely spaced patterns to form thick wall sections which are difficult to dry properly so as to prevent cracking when the mold is subsequently heated, such as during the pattern removal operation or when the mold is fired prior to casting.

The exact location of the patterns on the sprue member depends on several factors, including the size and complexity of the patterns, the size of the mold and the sprue, the size of the gate required for each pattern shape, and the metal from which the parts are to be cast. Because of the criticality involved in forming the set-up, the operation has required skilled and experienced personnel. The operation also has been extremely tedious and time-consuming. These problems have become particularly acute in the light of recent advancements in the lost wax process, particularly the invention of the hollow sprue disclosed in U.S. Patent No. 3,015,138, which have made it possible to cast several thousand parts in a single mold.

In order to facilitate proper positioning of the patterns when assembling a set-up and to provide for production control in the foundry, there has been a need for an efficient way of calculating the number of parts which can be cast in a mold and laying out the positions of the patterns on the sprue member before the actual fabrication of the set-up. There has also been a need for a means of enabling the person assemblying the set-up to locate the patterns in accordance with the predetermined optimum layout without the skill and time which have been required in the past.

This invention satisfies the foregoing needs and overcomes the problems heretofore involved in making a set-up for use in the lost wax process. In particular, the invention provides a means and techniques for calculating the number of parts which can be cast in a mold, the proper position of the patterns on the sprue member, the length of the pattern gates which will result in the desired spacing and the highest yield of castings from the mold and the amount of metal required to cast the mold. The invention also provides means which enables relatively unskilled personnel quickly and precisely to attach the patterns in the predetermined optimum positions.

The invention may be generally described as comprising in the preferred embodiment two layout scales. One of these scales is proportioned to the circumference of the particular sprue member to be used in making a mold, and the other scale is proportioned to the length of the sprue member. Using these scales, the layout engineer is able to determine the required spacing of the patterns and the precise locations at which the gates of the patterns should be connected to the sprue member. It is also possible to calculate the length of the gate which will result in the desired circumferential spacing of the patterns and the optimum yield of castings from the mold, the total number of patterns which can be connected to the sprue member, and the volume of metal required to cast the mold. The invention thereby provides for efficient layout and production control.

In accordance with an aspect of this invention, the sprue member itself may be formed with circumferential and longitudinal grid lines on its outer surface. The spacing of these lines corresponds to the spacing of the markings or graduations of the two lay-out scales. In assembling the set-up, the gate ends of the patterns are attached to the sprue member using the grid lines to locate the patterns around and along the length of the sprue member. Since the proper positions of the patterns has been determined in advance by the layout engineer, it is possible for the person assembling the setup precisely to position the patterns by counting the predetermined number of grid lines between each pattern. Thus, the invention makes it possible accurately to assemble the set-up in a more efficient manner than in the past.

Another feature of the invention resides in the structure of the novel sprue member which is useful in forming a pattern set-up or tree for the "lost wax" process of investment casting and which is of particular utility in carrying out the new techniques generally described above. In one preferred embodiment the sprue member comprises a tube, a separate corrugated cardboard sleeve around the tube and a wax coating on the outside of the sleeve. A sprue member constructed in this manner has the advantage of being easily removed from either a ceramic shell mold or a conventional bulk investment mold. When employing the novel sprue member in the layout technique described above, the horizontal and vertical grid lines can be printed either directly on the outer surface of the corrugated sleeve or on a separate paper which is wrapped around the wax-coated sleeve. According to another embodiment, the central sprue member may comprise a tube of wax, plastic or other expendable material and a sheet of grid paper which surrounds the tube.

Other advantages and a full understanding of the invention will be had from the following detailed description taken in conjunction with the accompanying drawings.

In the drawings:

FIGURE 3 is a view showing one layout scale;

FIGURE 4 is a view showing the other layout scale; and

Figure 1:
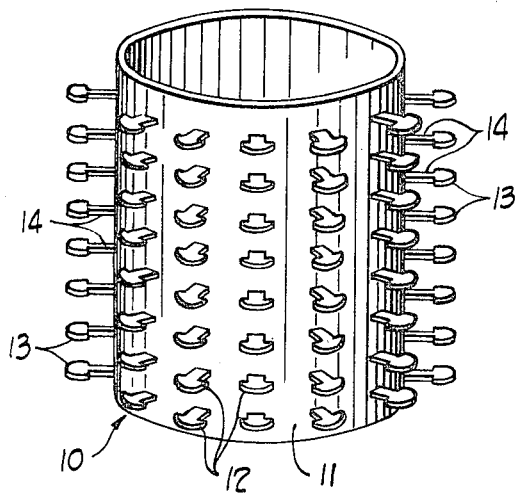
FIGURE 1 is a perspective view of an exemplary set-up or tree.

Referring now to the drawings, and to FIG. 1 in particular, the exemplary set-up is designated by reference numeral 10. The set-up 10 is comprised of a central sprue member 11 and a plurality of workpiece patterns 12 projecting from the outside wall of the sprue member.

In accordance with conventional practice, the patterns 12 and at least the outer wall portion of the sprue member 11 are formed of an expendable material, such as wax, a synthetic resin, or a wax and synthetic resin composition. The sprue member 11 is preferably cylindrical and may be solid in cross-section or in the form of a tube. Each of the patterns 12 includes a main portion 13 which defines the shape of the part to be cast in metal and a gate 14 which has its root end attached to the wall of the sprue member.

Figure 2:
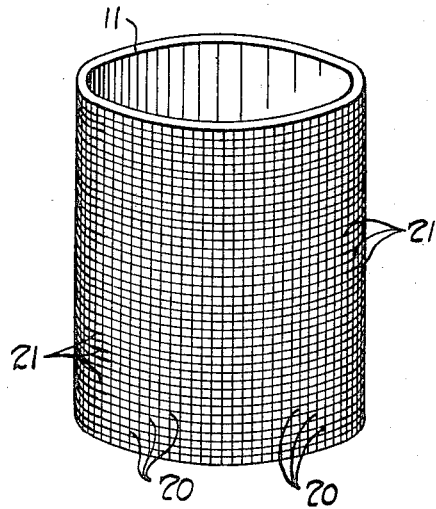
FIGURE 2 is a perspective view of a sprue member formed with grid lines in accordance with this invention.

As shown in FIG. 2, the outside of the sprue member 11 is covered with uniformly spaced vertical grid lines 20 and uniformly spaced circumferential grid lines 21, the lines having been eliminated from FIG. 1 for the sake of clarity. The exact distance between the vertical and horizontal lines is not critical, but may be on the order of one-eighth of an inch in order that the lines are easily discernible and can be quickly counted. If desired, certain vertical and circumferential lines, for example, every eighth line, may be heavier or darker than the rest.

Figure 2A:
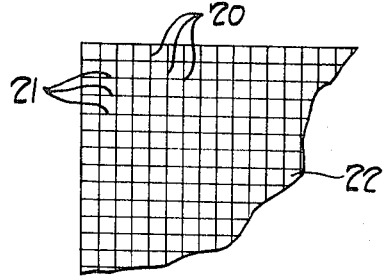
FIGURE 2a is a view showing a paper having grid lines which may be used in forming the sprue member.

The lines 20 and 21 may be imposed on the sprue member 11 in several different ways. One preferred technique is to provide a thin, relatively porous sheet of paper 22 (FIG. 2a) on which the lines 20 and 21 are suitably printed. The porosity of the paper 22 is such as to permit the material forming the outer wall surface of the sprue member 11 to pass through the paper when the material has been heated to a flowable state. In forming a wax sprue member 11, the paper 22 is rolled into a tube against the inside surface of the usual wax injection mold and the wax is simply injected into the mold within the rolled paper tube. Alternately, a wax sprue member 11 can be injection molded and the paper 22 thereafter wrapped around the sprue member and secured in place by any suitable means, as by tape, adhesive or the like.

Figure 5:
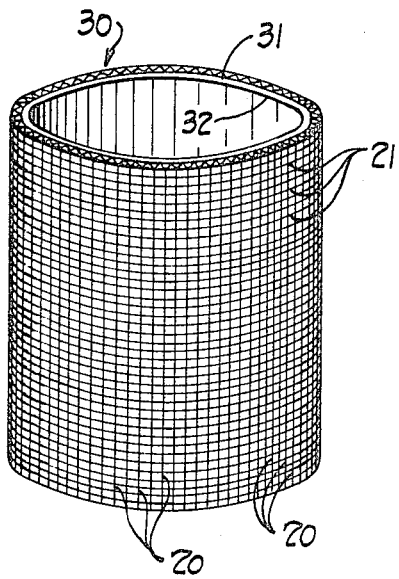
FIGURE 5 is a view showing a modified form of the sprue member.

Another preferred construction of the sprue member is shown in FIG. 5. In this embodiment, the sprue member 30 comprises an internally corrugated cardboard sleeve 31 having a smoother outer wall surface. The vertical grid lines 20 and the circumferential lines 21 may be printed on the smooth outer wall surface of the sleeve 31. The internally corrugated sleeve 31 is placed around a rigid cardboard tube 32 and the assembly is provided with an outer cylindrical wall formed by a thin coating of a low melting point wax (not shown). The wax can be coated on the sleeve 31 by rotating the sprue member 30 on a horizontal axis in a molten wax bath. The thickness of the wax coating which is formed is sufficient to permit the patterns (shown in FIG. 5) to be secured to the sprue member 30 by locally heating the wax coating and embedding the gate ends of the patterns in the softened wax. Preferably, the thickness of the wax coating is in the range of from about $\frac{1}{32}$ of an inch to about $\frac{1}{16}$ of an inch. As in the embodiment of FIG. 2, the sprue member 30 could be modified to comprise a wax coated assembly including the sleeve 21 mounted around the tube 32 and the porous paper 22 wrapped around the sleeve 31. After a mold (not shown) has been formed around a pattern set-up including the sprue member 30, the tube 32 can be easily slid from the sleeve 31 and the sleeve stripped from the inside of the mold.

Referring now to FIG. 3, there is shown a layout scale 48 which is adapted to be used in laying out the circumferential positions of workpiece patterns on a sprue member before assembling the set-up. As shown, the scale 48 is in the form of an annulus and includes a circular line 49. The diameter of the circle 49 is in proportion and is preferably approximately equal to the outside diameter of the particular sprue member to be used in the set-up. The scale 48 also includes uniformly spaced radial markings or graduations 50 which intersect the circle 49. The number of the graduations 50 and the spacing between the lines at the points of intersection with the circle 49 is preferably equal to the number and spacing of the vertical lines 20 on the sprue member. The spaces between the graduations 50 are sequentially numbered clockwise around the circle 49. It will be apparent that all of the numbered spaces on the scale 48 will be of equal size when the number and spacing of the graduations 50 is evenly divisible into the circumference of the circle 49. When the selected uniform spacing of the graduations 50 clockwise around the circle 49 is not evenly divisible into the circumference of the circle, the last numbered space on the scale will be smaller than the other spaces.

The second layout scale which is used to determine the longitudinal spacing of the patterns 12 is designated in FIG. 4 by reference numeral 60. The layout scale 60 has a length in proportion to the length of the sprue member and is comprised of a series of parallel graduations or lines 61 which are uniformly spaced apart a distance equal to the spacing between the circumferential lines 21 on the sprue member. The spaces between the graduations 61 are sequentially numbered from one end of the scale 60 to the other. The number of the graduations 61 may equal or exceed the number of lines 21 on the particular sprue member, and, if desired, the scale 60 may be marked off in inches as shown at the left in FIG. 4 to facilitate use of the scale with sprue members of different lengths.

When laying out a pattern set-up, two patterns 12a and 12b of the type to be used in the set-up 10 are placed on the circular scale 48 so that the root ends of the gates 14 abut the line 49 and the main portions 13 are radially outward of the line 49 over the lines 50. As shown in FIG. 3, the pattern 12a is positioned so that the left edge of the main pattern portion 13 is slightly to the right of the radial line between spaces zero and one. In this position the right hand corner of the gate 14 of the pattern 12a lies approximately on the line between the number five and the number six spaces, and the extreme right edge of the main pattern portion is within the number seven space.

The second pattern 12b is positioned adjacent the pattern 12a so that the main portions of the patterns are spaced apart a selected distance. As pointed out above, this distance will vary with the part design and other considerations, but it is usually on the order of 3/16 of an inch or slightly less. In the illustrated example, the spacing is approximately 1/8 inch. When the pattern 12b is placed in the desired position, it is observed that the right hand corner of its gate lies on the line between numbered spaces 12 and 13.

In the usual situation where the last numbered space of the scale 48 is smaller than the other spaces, the number of patterns which can be placed around the sprue member is calculated by determining the number of spaces between corresponding portions of the two pattern gates and dividing this number into one less than the total number of spaces on the scale 48. In the illustrated example, there are 7 spaces between the right hand corners of the pattern gates. Assuming that there are 219 spaces on the scale 48 it can be determined, by dividing 218 by 7 that 31 patterns can be placed around the sprue member.

It will be apparent that the number of patterns which can be placed around the sprue member can be increased while maintaining a desired spacing between the main pattern portions simply by lengthening the gates. Thus, the person making the layout can determine what the proper length of the gate should be to obtain a maximum yield of castings from the mold. The length of the gate will vary depending upon the design of the part, the metal to be cast and the feeding requirements.

In determining the number of patterns which can be attached lengthwise of the sprue member, the end surfaces of the gates 14 of the patterns 12a and 12b are placed against the layout scale 60, as shown in FIG. 4. The pattern 12a is positioned so that the entire main portion (not shown) is above the first line of the scale. In this position, the bottom edge of the gate is slightly above the first line on the grid and the top edge of the gate lines on the line between spaces two and three. The second pattern is stood on end and is spaced from the pattern 12a to allow the proper distance between the main portions of the patterns (not shown in FIG. 4). As noted above, this distance is usually on the order of 3/16 of an inch or slightly less. Thus positioned, it is observed that the bottom edge of the gate of the pattern 12b is within space four and that the top edge is on the line between spaces five and six.

The number of patterns that can be placed along the length of the sprue member is calculated by determining the spaces between corresponding portions of the two pattern gates and dividing that number into the number of spaces corresponding to the usable length of the sprue member. When positioned as shown in FIG. 4, the number of spaces between corresponding edges of the pattern gates is three. Assuming that the sprue member has a usable length of 14 inches, the number of patterns in each vertical row on the set-up will be 112 divided by three or 37.

It will be apparent from the foregoing that the total number of patterns to be used in the illustrative set-up can be determined to be 1147 by multiplying the number of patterns in a horizontal row by the number of patterns in a vertical row. By making it possible for a person to determine in advance the total number of patterns which can be cast in a single mold using a sprue member of any given size, the invention facilitates efficient production planning and layout control.

It will also be apparent that the invention facilitates the actual assembly of the set-up. The person making a set-up positions the first pattern at the end of the sprue member so that the right hand edge of the gate is on one of the lines 20 and the bottom edge of the gate is on one of the lines 21. In positioning the patterns around the sprue member, the second pattern is positioned so that the right hand edge of its gate is spaced from the corresponding edge of the first pattern gate by the number of spaces previously determined by use of the layout scale 48. Thus, in carrying out the described example of the invention, the location of the right side edge of each pattern in a circumferential row is determined by counting seven spaces from the right-hand side edge of the previously positioned pattern gate. In a similar manner, the location of each subsequent horizontal row of patterns is determined by counting the number of spaces previously determined by use of the scale 60. For example, if the desired vertical spacing between patterns was determined to be three spaces, the location of the bottom edges of the gates of each horizontal row of patterns is determined by counting three spaces down from the bottom edges of the previously attached patterns.

If desired, the scales 48 and 60 can be employed without the conjoint use of a sprue member having the illustrated grid lines. In such an instance, a suitable indexing jig or other structure can be provided to position the sprue member for attachment of the patterns in accordance with the spacing previously determined by use of the scales. Conversely, the sprue member having visible grid lines can be used to advantage without employing the scales 48 and 60.

Many other modifications and variations of the invention will be apparent to those skilled in the art in view of the foregoing detailed description. Therefore, it is to be understood that, within the scope of the appended claims, the invention can be practiced otherwise than as specifically shown and described.

What is claimed is:

1. In a process of investment casting in which a refractory mold is formed around a pattern set-up including a generally cylindrical sprue member and a plurality of patterns which extend from the sprue member and are arranged in a plurality of rows, each of the patterns having a main portion and a gate, a method of forming the set-up comprising the steps of:
   (a) providing a first layout scale including a plurality of spaced graduations,
      (i) said first scale being calibrated to correspond to incremental distances on the sprue member in the direction of the rows of patterns to be attached thereto,
   (b) locating a pattern shape relative to said first scale in a first position so that at least part of the gate of the pattern shape and said graduations are superposed,
   (c) locating a pattern shape relative to said first scale in a second position adjacent said first position so that
      (i) the main portion of the pattern shape in said second position is spaced from the main portion of the pattern shape in said first position a distance which is sufficient to permit the proper formation of the mold walls between adjacent patterns when attached in a row on the sprue member,
      (ii) the distance between a portion of the gate of the pattern shape in said second position and a corresponding portion of the gate of the pattern shape in said first position can be determined by said scale,
      (iii) the total number of spaced patterns which can be attached in a row on the sprue member can be determined,
   (d) and attaching the gates of a plurality of patterns proportioned to said pattern shapes to the sprue member,
      (i) the patterns being arranged in rows with the gates of the patterns in each row being spaced from each other in accordance with the distance determined by use of said first scale.

2. The process as claimed in claim 1 wherein:
 (e) said first scale is calibrated in relation to the circumference of the sprue member; and
 (f) the patterns are attached to the sprue member in circumferential rows.

3. The process as claimed in claim 1 wherein:
 (e) said first scale is calibrated in relation to the length of the sprue member; and
 (f) the patterns are attached to the sprue member in longitudinal rows.

4. The process as claimed in claim 1 including:
 (e) providing the sprue member with parallel markings spaced apart a distance in proportion to the spacing of the graduations of said first scale;
 (f) and wherein the patterns are attached to the sprue member by positioning the ends of the pattern gates against said markings.

5. The process as claimed in claim 1 including the steps of:
 (e) providing a second layout scale including spaced graduations;
   (i) said second scale being calibrated to correspond to incremental distances on the sprue member in a direction transverse to the direction of calibration of said first scale;
 (f) locating a pattern shape relative to said second scale in a first position;
 (g) locating a pattern shape relative to said second scale in a second position adjacent said first position so that
   (i) the main portion of the pattern shape in said second position is spaced from the main portion of the pattern shape in said first position a distance which is sufficient to permit the proper formation of mold walls between adjacent rows of patterns when attached on the sprue member,
   (ii) the distance between a portion of the gate of the pattern shape in said second position and a corresponding portion of the gate of the pattern shape in said first position can be determined by said scale,
   (iii) the total number of rows of patterns which can be attached on the sprue member can be determined,
 (h) and spacing the rows of said patterns on the sprue member from each other in accordance with the distance determined by use of said second scale.

6. The process as claimed in claim 5 wherein:
 (i) said first scale includes a curved line drawn on a radius equal to the outer radius of the sprue member, said curved line being intersected by the graduations of said first scale;
 (j) the pattern shape is located in relation to said first scale so that in said first and second positions the end of the gate of the pattern shape is on said curved line and the main portion of the pattern shape is radially outward of the curved line.

7. The process as claimed in claim 6 wherein:
 (k) said second scale is calibrated to indicate incremental distances along the length of the sprue member; and
 (l) the pattern shape is placed on said second scale so that in said first and second positions the end surface of the gate of the pattern shape and said second scale are superposed.

8. The process as claimed in claim 7 including:
 (m) providing the sprue member with circumferential lines which are spaced apart a distance equal to the spacing of the graduations of said second scale; and
 (n) providing the sprue member with longitudinal lines which are spaced apart a distance equal to the spacing of the graduations of said first scale.

9. A process as claimed in claim 11 in which the scale has a curved line drawn on a radius equal to the outer radius of the sprue member and the graduations of the scale are formed by radial lines intersecting the curved line, and the pattern is positioned on the scale so that the end of the pattern gate touches the curved line and so that the pattern projects radially beyond the curved line with one edge of the main portion of the pattern touching a radial line of the scale.

10. In a process of investment casting in which a refractory mold is formed around a pattern set-up including a sprue member and a plurality of patterns which extend from and are positioned in rows along the sprue member, each pattern having a main portion and a gate attached to the sprue member, a method of forming the set-up comprising the steps of:
 (a) providing a scale having spaced graduations which are operable to sub-divide the sprue member in the direction of the rows of patterns to be attached thereto;
 (b) positioning at least one pattern on the scale to enable the determination of the spacing between the gates of two such patterns when attached to the sprue member adjacent to each other in a row with the main portions of the pattern spaced apart a distance which is sufficient to permit the proper formation of the mold walls adjacent patterns, and to enable the determination of the total number of spaced patterns which can be attached in a row on the sprue member;
 (c) and attaching patterns to the sprue member in rows so that the gates of the patterns in each row are spaced apart by the distance determined from the scale.

11. A process as claimed in claim 10 wherein the sprue member is a body of generally uniform cross-sectional shape in a direction along its length, wherein the scale sub-divides the periphery of the sprue member, and wherein the step of attaching the patterns to the sprue member is carried out by positioning the patterns in rows extending around the periphery of the sprue member.

12. A process as claimed in claim 11 including the steps of providing another scale having spaced graduations which are operable to sub-divide the length of the sprue member, positioning at least one pattern on said another scale to enable the determination of the spacing between the gates of two such patterns when attached to the sprue member in adjacent rows with the main portions of the patterns spaced apart a distance which is sufficient to permit the proper formation of the mold walls between the rows of patterns and to enable the determination of the total number of spaced rows of patterns which can be attached on the sprue member, and attaching the patterns to the sprue member so that the rows of patterns are spaced apart by the distance determined from said another scale.

13. A process as claimed in claim 10 wherein the scale is formed by a series of parallel lines which sub-divide the length of the sprue member, and wherein the pattern is positioned on the scale so that the end surface of the gate is against the scale with one face of the main portion of the pattern lying in a plane containing a graduation of the scale and perpendicular to the plane of the scale face.

14. In a process of investment casting in which a refractory mold is formed around a pattern set-up including a sprue member and a plurality of patterns which extend from and are positioned in rows along the sprue member, each pattern having a main portion and a gate attached to the sprue member, a method of forming the set-up comprising the steps of:
 (a) providing a scale having spaced graduations which are operable to subdivide the sprue member in the direction of the rows of patterns to be attached thereto;
 (b) positioning a pattern in two positions on the scale so that the main portion of the pattern in one position is spaced from the main portion of the pattern in the other position by a distance sufficient to permit the proper formation of the mold walls between adjacent patterns in a row when attached to the sprue member and so that the ends of the pattern gates in both positions overlie the graduations of the scale whereby the distance between corresponding portions of the pattern gates can be determined from the scale and whereby the total number of spaced patterns which can be attached in a row on the sprue member can be determined;

(c) and attaching patterns to the sprue member in rows so that the gates of the patterns in each row are spaced apart by the distance determined from the scale.

15. The process as claimed in claim 14 including the steps of providing another scale having spaced graduations which are operable to sub-divide the sprue member in a direction transverse to the row of patterns to be attached thereto, positioning a pattern in two positions on said another scale so that the main portion of the pattern in one position is spaced from the main portion of the pattern in another position by a distance sufficient to permit the proper formation of the mold walls between adjacent rows of patterns when attached to the sprue member and so that the ends of the pattern gates in both positions overlie the graduations of said another scale, whereby the distance between the gates of patterns in adjacent rows can be determined and whereby the total number of rows of patterns that can be attached to the sprue member can be determined, and attaching the patterns to the sprue member so that the rows of patterns are spaced apart by the distance determined from said another scale.

References Cited

UNITED STATES PATENTS

| | | | |
|---|---|---|---|
| 1,354,913 | 10/1920 | McKechnie | 164—241 X |
| 1,358,906 | 11/1920 | Wendt | 164—241 |
| 3,094,751 | 6/1963 | Horton | 164—36 |
| 3,139,656 | 7/1964 | Watts et al. | 164—244 |
| 3,249,972 | 5/1966 | Watts et al. | 164—361 X |

FOREIGN PATENTS

| | | |
|---|---|---|
| 906,845 | 9/1962 | Great Britain. |

J. SPENCER OVERHOLSER, *Primary Examiner.*

R. S. ANNEAR, *Assistant Examiner.*

U.S. Cl. X.R.

164—244